US010686992B2

(12) United States Patent
Baig et al.

(10) Patent No.: US 10,686,992 B2
(45) Date of Patent: Jun. 16, 2020

(54) IMAGE ORIENTATION NOTIFICATION AND ADJUSTMENT

(71) Applicant: QUALCOMM Incorporated, San Diego, CA (US)

(72) Inventors: Mirza Shakeel Baig, Hyderabad (IN); Mohammad Haris Badaja, Hyderabad (IN); Yashpal Singh Jasawat, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/051,287

(22) Filed: Jul. 31, 2018

(65) Prior Publication Data

US 2020/0045238 A1    Feb. 6, 2020

(51) Int. Cl.
| | |
|---|---|
| *H04N 5/232* | (2006.01) |
| *G06F 3/0346* | (2013.01) |
| *G06F 3/0484* | (2013.01) |
| *H04N 5/262* | (2006.01) |

(52) U.S. Cl.
CPC ..... *H04N 5/232935* (2018.08); *G06F 3/0346* (2013.01); *G06F 3/04845* (2013.01); *H04N 5/23222* (2013.01); *H04N 5/232939* (2018.08); *H04N 5/2628* (2013.01)

(58) Field of Classification Search
CPC ........... H04N 5/2628; H04N 5/232939; H04N 5/232935
See application file for complete search history.

(56) References Cited

U.S. PATENT DOCUMENTS

| | | | |
|---|---|---|---|
| 7,593,627 B2 * | 9/2009 | Wernersson | H04N 5/232 396/147 |
| RE42,639 E | 8/2011 | Anderson | |
| 9,800,778 B2 | 10/2017 | Haehnichen | |
| 9,897,439 B2 * | 2/2018 | Hu | G01B 11/26 |
| 2005/0264653 A1 | 12/2005 | Starkweather et al. | |
| 2011/0066963 A1 * | 3/2011 | Schrag | G06F 3/04815 715/769 |
| 2016/0373647 A1 | 12/2016 | García et al. | |
| 2019/0141237 A1 * | 5/2019 | Kishimoto | H04N 5/23222 |

\* cited by examiner

*Primary Examiner* — Ryan R Yang
(74) *Attorney, Agent, or Firm* — Paradice & Li LLP

(57) ABSTRACT

Aspects of the present disclosure relate to systems and methods for indicating and adjusting an orientation of an image. An example device may include a processor and a memory. The processor may be configured to receive an image from a camera, determine a first orientation of the image based on an orientation of the camera during capture of the image, determine a final orientation for the image after processing based on an orientation of the device, generate a visual indication to indicate the final orientation for the image after processing, output the image to a display to display the image in the first orientation, and output the visual indication to the display to indicate the final orientation.

25 Claims, 9 Drawing Sheets

600

```
┌─────────────────────────────────────────────────────────────────┐
│ Display an image with a first orientation and a visual          │
│ indication of the final orientation for the image after         │
│ processing.  602                                                │
└─────────────────────────────────────────────────────────────────┘
                                │
                                ▼
┌─────────────────────────────────────────────────────────────────┐
│ Receive a user input for adjusting the orientation of the       │
│ image.  604                                                     │
│ ┌─────────────────────────────────────────────────────────────┐ │
│ │ Receive a user touch on the display to adjust the           │ │
│ │ orientation.  606                                           │ │
│ └─────────────────────────────────────────────────────────────┘ │
│                                │                                │
│                                ▼                                │
│ ┌─────────────────────────────────────────────────────────────┐ │
│ │ Adjust the final orientation and the visual indication. 608│ │
│ └─────────────────────────────────────────────────────────────┘ │
└─────────────────────────────────────────────────────────────────┘
                                │
                                ▼
┌─────────────────────────────────────────────────────────────────┐
│ Display the image with the first orientation and the adjusted   │
│ visual indication based on the user input.  610                 │
└─────────────────────────────────────────────────────────────────┘
```

FIG. 6

IMAGE ORIENTATION NOTIFICATION AND ADJUSTMENT

TECHNICAL FIELD

This disclosure relates generally to systems and methods for image capture devices, and specifically to the orientation of captured images.

BACKGROUND

Devices may include or be coupled to one or more digital cameras to capture images and video, and the camera sensor of a digital camera has a fixed orientation compared to the device. For example, a smartphone or tablet includes one or more cameras on the back (opposite the side with the display) and one or more cameras on the front (on the side with the display), and the cameras in a smartphone or tablet are fixed with the camera sensors having a fixed orientation relative to the smartphone or tablet.

When a device is to be used to capture an image or video, the device may be oriented in different ways. For example, a user may orient vertically a smartphone for capturing portraits and orient horizontally a smartphone for capturing landscapes. Since the camera sensor has a fixed orientation relative to the device, and the device may be rotated or placed in different orientations for capture, the orientation of a captured image from the camera sensor may have a different orientation than the user. For example, if a device is held upside down by a user when capturing an image, the captured image from the camera sensor may be upside down when displaying the captured image to the user or when storing the image in memory.

To compensate for differences in orientation between a user and the captured images, a device may adjust the orientation of the image after capture and during the image processing pipeline. For example, a device may use an accelerometer to attempt to determine the device orientation during capture and adjust the orientation of the captured image based on the determined device orientation. However, there are some situations where the device is unable to determine its orientation, or the orientation may be incorrect such that the adjusted orientation of a captured image is incorrect.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to systems and methods for image orientation. An example device may include a processor and a memory. The processor may be configured to receive an image from a camera, determine a first orientation of the image based on an orientation of the camera during capture of the image, determine a final orientation for the image after processing based on an orientation of the device, generate a visual indication to indicate the final orientation for the image after processing, output the image to a display to display the image in the first orientation, and output the visual indication to the display to indicate the final orientation.

In another example, a method is disclosed. The example method includes receiving an image from a camera, determining a first orientation of the image based on an orientation of the camera during capture of the image, determining a final orientation for the image after processing based on an orientation of the device, generating a visual indication to indicate the final orientation for the image after processing, outputting the image to a display to display the image in the first orientation, and outputting the visual indication to the display to indicate the final orientation.

In a further example, a non-transitory computer-readable medium is disclosed. The non-transitory computer-readable medium may store instructions that, when executed by a processor, cause a device to perform operations including receiving an image from a camera, determining a first orientation of the image based on an orientation of the camera during capture of the image, determining a final orientation for the image after processing based on an orientation of the device, generating a visual indication to indicate the final orientation for the image after processing, outputting the image to a display to display the image in the first orientation, and outputting the visual indication to the display to indicate the final orientation.

In another example, a device is disclosed. The device includes means for capturing an image, means for determining a first orientation of the image based on an orientation of capture of the image, means for determining a final orientation for the image after processing based on an orientation of the device, means for generating a visual indication to indicate the final orientation for the image after processing, means for displaying the image in the first orientation, and means for displaying the visual indication to indicate the final orientation.

BRIEF DESCRIPTION OF THE DRAWINGS

Aspects of the present disclosure are illustrated by way of example, and not by way of limitation, in the figures of the accompanying drawings and in which like reference numerals refer to similar elements.

FIG. 6 is an illustrative flow chart depicting an example operation for adjusting an orientation of an image based on a user input.

DETAILED DESCRIPTION

Aspects of the present disclosure may be used for adjusting an orientation of a captured image. A device may use an accelerometer or other sensors to attempt to determine an orientation of a device during image capture. The device may then use the determined orientation of the device to adjust the orientation of the captured image. For example, the device may attempt to adjust the orientation of the image to be the same as the orientation of the user or the person to view the image. In a specific example, if the device is upside down in relation to the user when an image is captured (as may be determined using an accelerometer or other sensor), the processed image without being reoriented may be upside down when viewed by the user on the device when the device is reoriented to be the same as the user. As a result, the device may rotate the image 180 degrees to align the orientation of the image with the orientation of the user. However, the device may not be able to determine its orientation relative to the user in some circumstances.

In addition, the orientation of an image being captured or to be captured and displayed on a device is not adjusted until the image is processed into the final image for storage. For example, a preview image before capture of an image to be processed may be displayed with an orientation as to be captured by a camera (without adjustment to the orientation to compensate for the device orientation). As a result, the user may be unaware of the final orientation of an image until after the image is processed. If the orientation of the image is incorrect or unacceptable, the user may be required to adjust the orientation post-processing or adjust the orientation of the device and capture a new image for processing (thus negatively affecting the user experience).

Figure 1A:
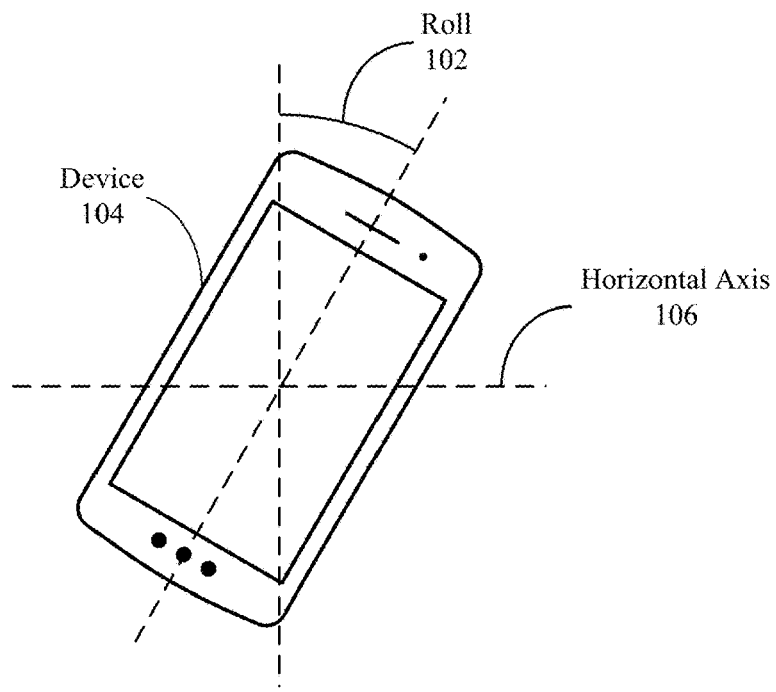
FIG. 1A is a depiction of an example roll component of a device orientation.
Figure 1B:
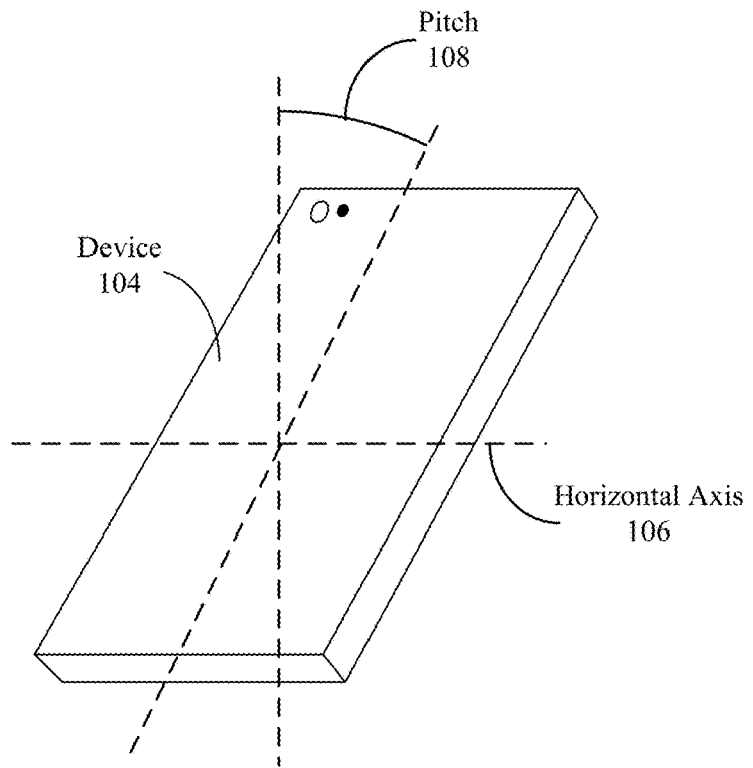
FIG. 1B is a depiction of an example pitch component of a device orientation.
Figure 1C:
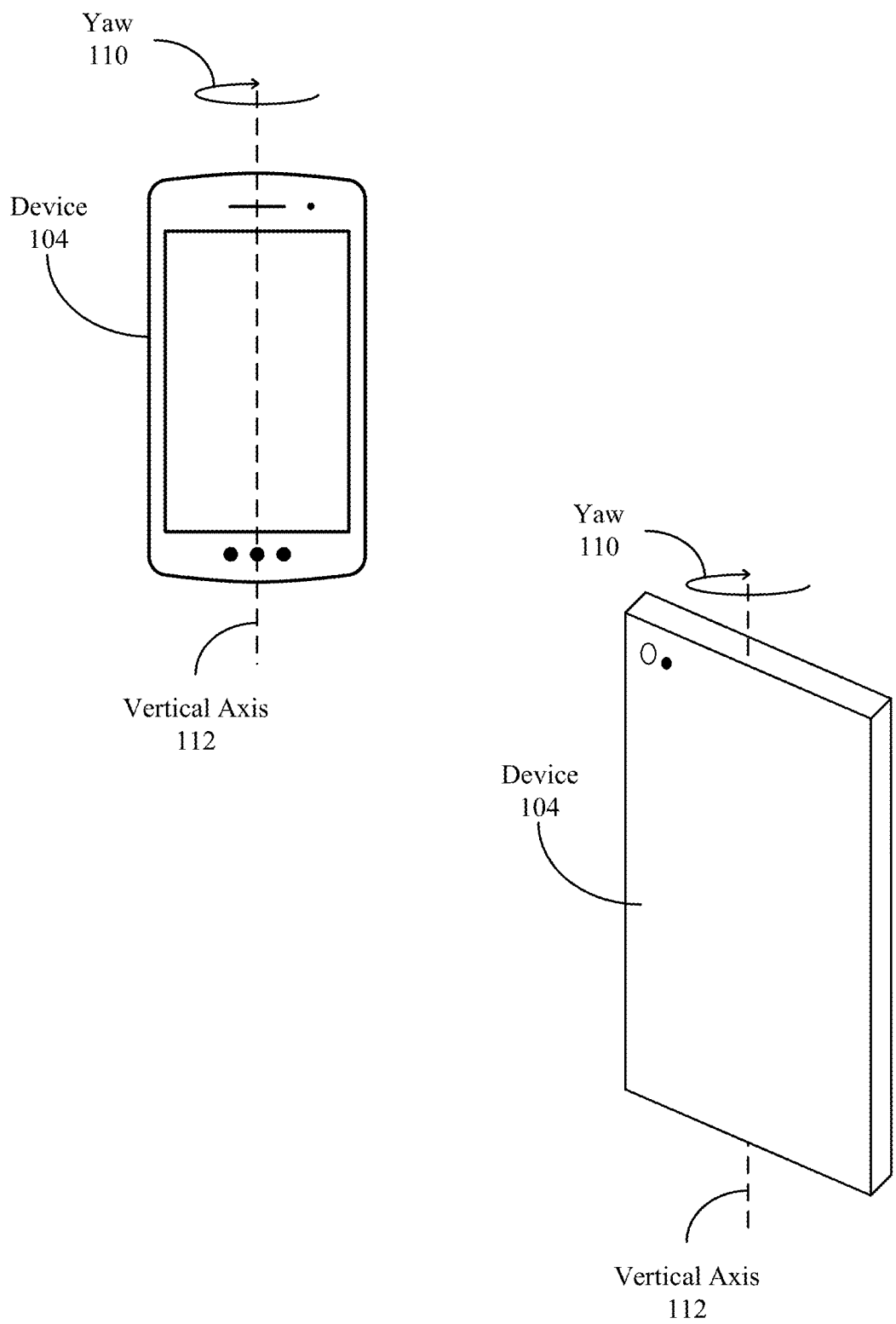
FIG. 1C is a depiction of an example yaw component of a device orientation.

Three example components of a device or camera orientation include roll, pitch, and yaw. FIGS. 1A-1C depict roll, pitch, and yaw, respectively, in relation to the device. A horizontal axis and a vertical axis are depicted for illustrative purposes. FIG. 1A depicts an example roll 102 of an example device 104. The roll 102 is depicted as the angle of the device 104 rotated along its side (tilted left or right). The zero-angle reference for the roll 102 is depicted as being perpendicular to the horizontal axis 106 (such as in a portrait mode) when the pitch (described below regarding FIG. 1B) is zero. In FIG. 1A, the roll 102 is illustrated as the device 104 being rotated right from a portrait mode.

FIG. 1B depicts an example pitch 108 of the example device 104. The pitch 108 is depicted as the angle of the device 104 rotated along its front or rear (tilted forward or backward). For the pitch 108, the roll is depicted as being zero, with the device 104 rotated neither right nor left (in a portrait mode). In FIG. 1B, the pitch 108 is illustrated as the device 104 being tilted down.

FIG. 1C depicts an example yaw 110 of the example device 104. The yaw 110 is depicted as the angle of rotation of the device 104 along an axis parallel to the device's landscape orientation. For example, if the pitch is zero and the roll is zero, the yaw 110 is the angle of rotation along the vertical axis 112. The roll, pitch, and yaw of a device may characterize the orientation of a device, and thus the orientation of a camera sensor fixed relative to the device.

The intention of adjusting the orientation of a captured image or image to be captured may be to adjust the orientation of the image to be the same as the user. However, the orientation of the user is unknown. For example, it is unknown if the user is standing (approximately perpendicular to the horizontal plane of the earth), is lying down (approximately parallel to the horizontal plane of the earth), is leaned over (the device is tilted down or up), etc. To compensate, the device may adjust the orientation of a captured image or image to be captured using the assumption that a user is perpendicular to the horizontal plane of the earth (such as standing or sitting). In this manner, the device may determine the orientation of the device relative to the earth.

A device may analyze image captures or a preview stream to determine an orientation of the device. For example, an image may include a horizon, and the device may identify the horizon line as a horizontal axis of the earth. The device may determine a roll from a tilt of the horizon in the image, and the device may determine a pitch from the location of the horizon. For example, the horizon may appear higher than the center in an image if the device is tilted down, and the horizon may appear lower than the center in an image if the device is tilted up.

In addition or alternative to using an image or preview, the device may use one or more sensor measurements to determine an orientation of the device relative to the earth. For example, the device may determine the direction of earth's gravitational force to determine an orientation of the device relative to the earth. In some examples, a device accelerometer may indicate all forces on the device, including linear forces (such as movement from riding in a car, walking, etc.), rotational forces (such as actively rotating or twisting the device), and gravitational forces (applied by earth's gravity which are relatively constant on the device). The device may use its gyroscope measurements (indicating linear and rotational forces) in removing the linear and rotational forces from the accelerometer measurements, thus leaving the gravitational force. The device may then determine the direction of the gravitational force to be the direction of the ground (down).

In adjusting the orientation of a captured image or image to be captured by rotating the image, the device may compensate for a roll of the device, which is a device rotation parallel to the captured image or image to be captured. If the device (and the camera sensor) is not oriented directly toward the ground (such as the pitch not being near or at −90 degrees when the roll is zero, or the yaw not being near or at 90 degrees when the roll is 90 degrees) or directly toward the sky (such as the pitch not being near or at 90 degrees when the roll is zero, or the yaw not being near or at −90 degrees when the roll is 90 degrees), the determined gravitational force may be used in determining a roll of the device. The orientation of an image may thus be adjusted based on the determined roll of the device.

If the device (and the camera sensor) is oriented directly toward the ground (down) or directly toward the sky (up), the device may be unable to determine its roll from the direction of the determined gravitational force. For example, if a smartphone is directed down toward a table to capture an image of a paper on the table, the direction of the gravitational force may be the same for any roll of the smartphone. Additionally, the horizon does not appear in images captured when the device is oriented directly down or directly up.

If a current device orientation (such as the roll) is unknown, a device may adjust the orientation of an image relative to a previous orientation of the device before being oriented directly down or directly up. For example, the last determined roll of the device (such as whether the device was upside down, in a landscape mode, in a portrait mode, etc.) may be used for orienting an image captured or to be captured when the device is oriented directly down or directly up.

If the last determined roll of the device is used in adjusting the orientation of an image, an image captured or to be captured when the device is pointed directly down or directly up may be rotated by a variety of degrees dependent on the previous orientation of the device. A device may attempt to orient the image in one of the four cardinal directions of a phone (up, down, left and right) that are separated by 90 degrees rotation. FIGS. 2A-2D depict example previous orientations of a smartphone before being oriented directly down and example orientations of the images captured based on the previous orientations.

Figure 2A:
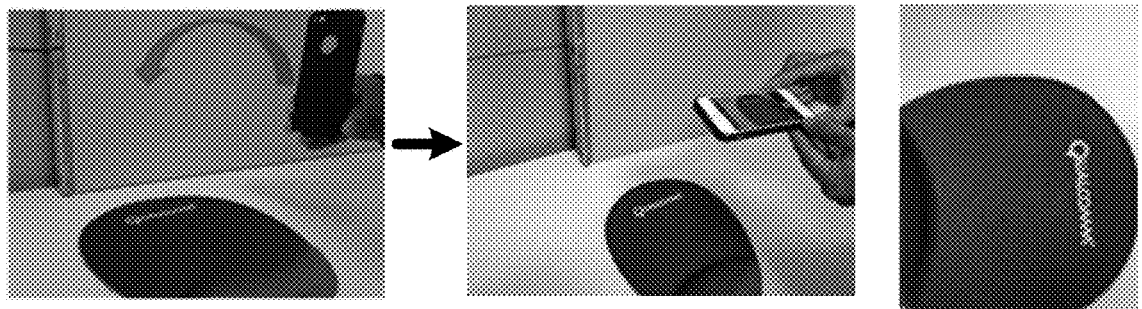
FIG. 2A is a depiction of an example image orientation based on a first previous device orientation.
Figure 2B:
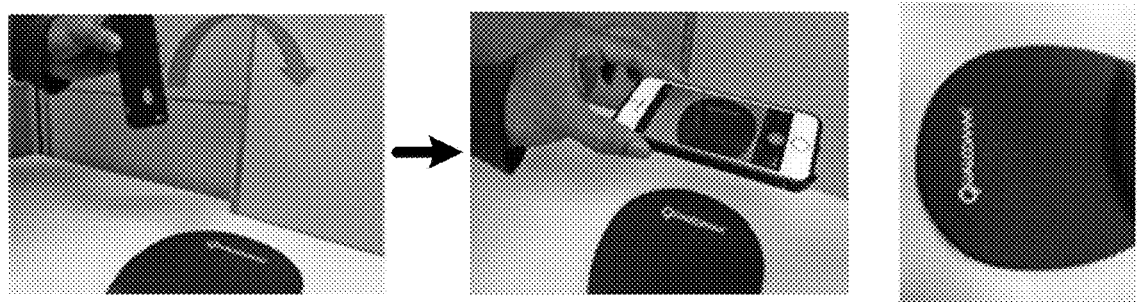
FIG. 2B is a depiction of an example image orientation based on a second previous device orientation.

FIG. 2A depicts the device in a portrait orientation and not upside down before being oriented directly down. The orientation of a resulting image 202 is based on the orientation of the device being in a portrait orientation and not upside down before being oriented directly down. For example, the orientation of the image 202 is a portrait orientation. FIG. 2B depicts the device in a portrait orientation and upside down before being oriented directly down. The orientation of a resulting image 204 is based on the orientation of the device being in a portrait orientation and upside down before being oriented directly down. For example, the orientation of the image 204 is a portrait orientation and is rotated 180 degrees relative to the orientation of the image 202 in FIG. 2A.

Figure 2C:
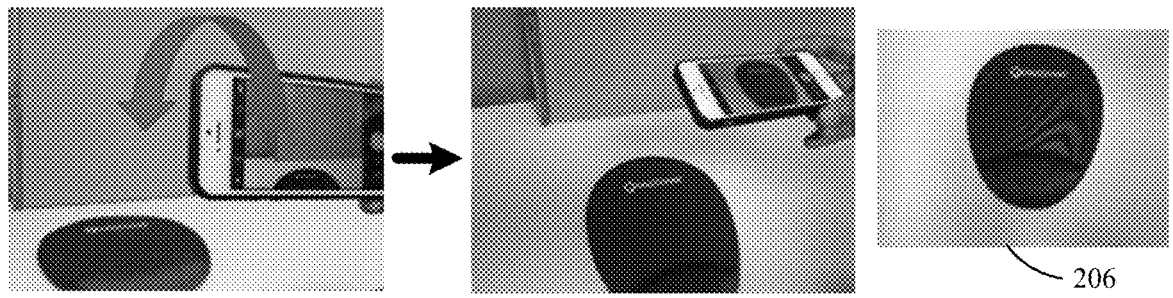
FIG. 2C is a depiction of an example image orientation based on a third previous device orientation.
Figure 2D:
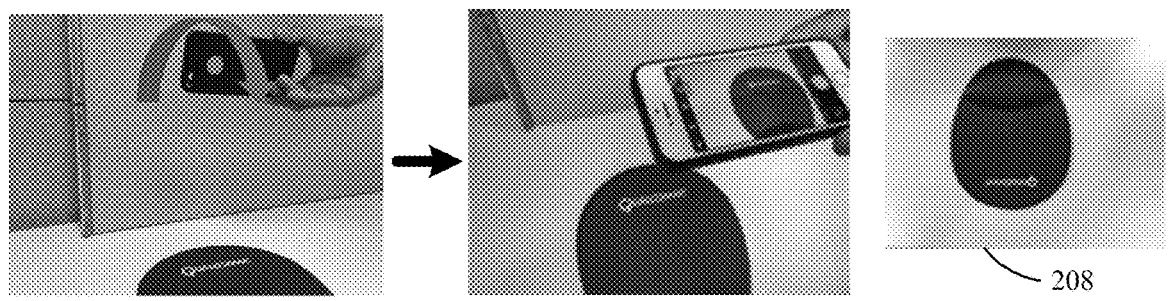
FIG. 2D is a depiction of an example image orientation based on a fourth previous device orientation.

FIG. 2C depicts the device in a landscape orientation, rotated 90 degrees left (roll of −90 degrees), before being oriented directly down. The orientation of a resulting image 206 is based on the orientation of the device being in a landscape orientation (roll of −90 degrees). For example, the orientation of the image 206 is a landscape orientation. FIG. 2D depicts the device in a landscape orientation, rotated 90 degrees right (roll of 90 degrees), before being oriented directly down. The orientation of a resulting image 208 is based on the orientation of the device being in a landscape orientation (roll of −90 degrees). For example, the orientation of the image 208 is a landscape orientation and rotated 180 degrees relative to the orientation of the image 206 in FIG. 2C.

To capture an image with a specific orientation after adjustment, a user is required to orient the device a specific way before the device is oriented directly down or up. If the user is unaware or unsure of the previous orientation of the device, a resulting image may be oriented differently than desired. Further, the user may be unaware of the orientation of the image until after the image is processed. The user may therefore be required to recapture an image after adjusting the orientation of the device before again orienting the device directly down or up. Requiring a user to be aware of and adjust orientations of the device to capture or recapture an image may negatively impact the user experience.

In some example implementations, a device may notify a user of the final orientation of an image to be captured. The notification may be a visual indication to indicate the adjustment to the image orientation to be made during the image processing pipeline. For example, the device may display a preview and a visual indication on the preview of a portion or edge of the image. For example, the visual indication may indicate the determined top of the image (such as highlighting the edge to be the top of the image after adjusting the orientation). In some additional example implementations, the device may adjust the proposed orientation of an image based on a user input. In this manner, the device may capture an image with a correct resulting orientation without requiring the user to remember previous orientations of the device, and therefore prevent trial and error in orienting the device or multiple attempts by the user to capture an image with an intended orientation.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device (such as a security system with one or more cameras, smartphones, tablets, laptop computers, digital video and/or still cameras, web cameras, and so on) configured to or capable of capturing images or video. While described below with respect to a device having or coupled to one camera, aspects of the present disclosure are applicable to devices having any number of cameras, and are therefore not limited to devices having one camera. Aspects of the present disclosure are applicable for capturing still images as well as for capturing video, and may be implemented in devices having or coupled to cameras of different capabilities (such as a video camera or a still image camera).

The term "device" is not limited to one or a specific number of physical objects (such as one smartphone, one camera controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. For example, while some of the following examples use a smartphone as a type of device, the device is not limited to a smartphone.

Figure 3:
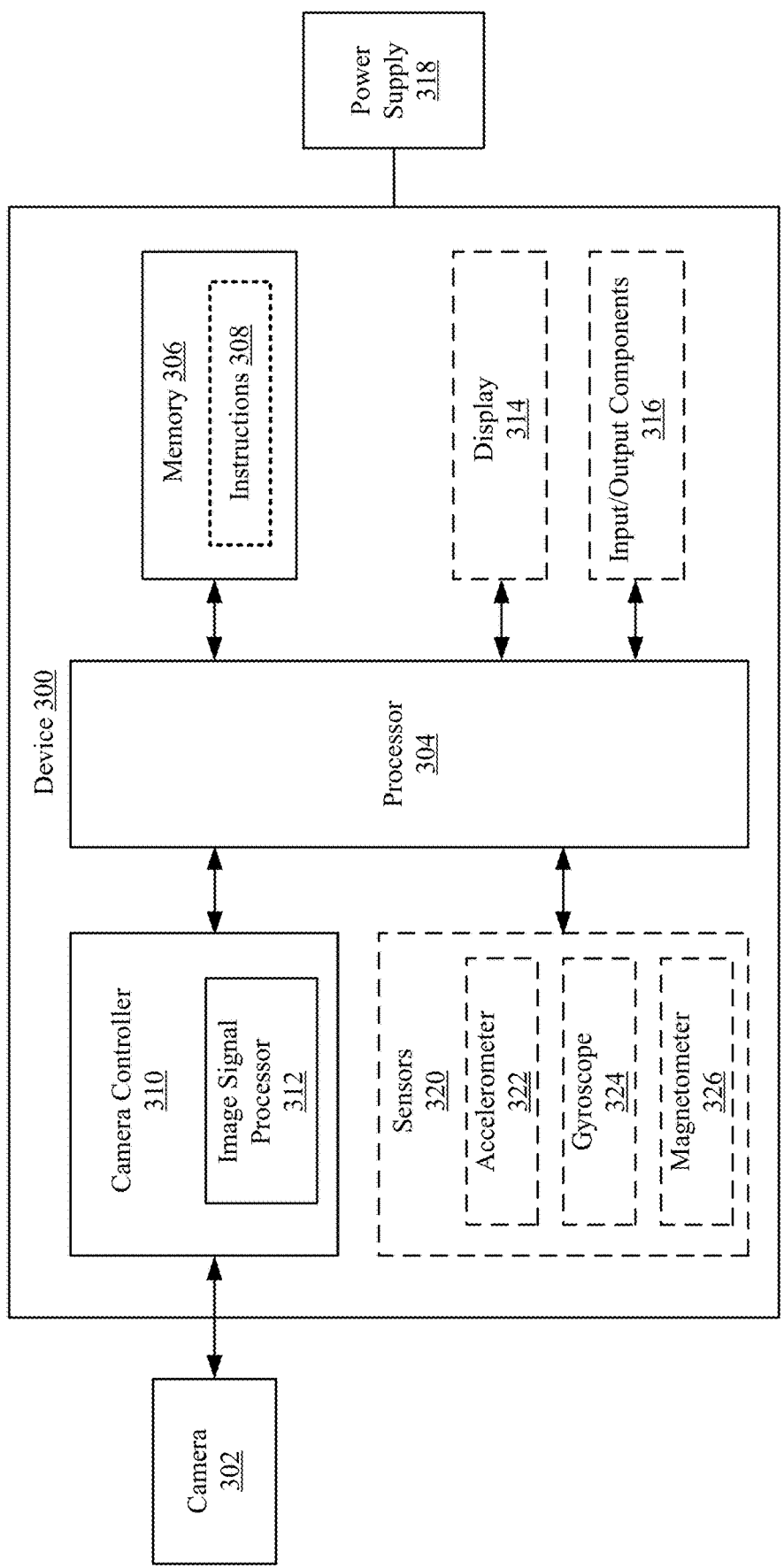
FIG. 3 is a block diagram of an example device for identifying and/or adjusting image orientations.

FIG. 3 is a block diagram of an example device 300 for performing aspects of the present disclosure. For example, the device 300 may indicate a final orientation of an image to be captured or being captured before processing (by the image processing pipeline) is complete. In another example, the device 300 may adjust the orientation of the image based on a user input (such as a user input via a graphical user interface).

The example device 300 may include or be coupled to a camera 302, a processor 304, a memory 306 storing instructions 308, and a camera controller 310. The device 300 may optionally include (or be coupled to) a display 314, one or more input/output (I/O) components 316, and one or more sensors 320 (such as an accelerometer 322, a gyroscope 324, and a magnetometer 326 to be used in determining the gravitational force on the device 300). The device 300 may include additional features or components not shown. For example, a wireless interface, which may include a number of transceivers and a baseband processor, may be included for a wireless communication device. The device 300 may include or be coupled to additional cameras other than the camera 302. The disclosure should not be limited to any specific examples or illustrations, including the example device 300.

The camera 302 may be capable of capturing individual image frames (such as still images) and/or capturing video (such as a succession of captured image frames). The camera 302 may include a single camera sensor and camera lens, or be a dual camera module or any other suitable module with multiple camera sensors and lenses. The memory 306 may be a non-transient or non-transitory computer readable medium storing computer-executable instructions 308 to perform all or a portion of one or more operations described in this disclosure. The device 300 may also include a power supply 318, which may be coupled to or integrated into the device 300.

The processor 304 may be one or more suitable processors capable of executing scripts or instructions of one or more software programs (such as instructions 308) stored within the memory 306. In some aspects, the processor 304 may be one or more general purpose processors that execute instructions 308 to cause the device 300 to perform any number of functions or operations. In additional or alternative aspects, the processor 304 may include integrated circuits or other hardware to perform functions or operations without the use of software. While shown to be coupled to each other via the processor 304 in the example device 300 of FIG. 3, the processor 304, the memory 306, the camera controller 310, the optional display 314, the optional I/O components 316, and the optional sensors 320 may be coupled to one another in various arrangements. For example, the processor 304, the memory 306, the camera controller 310, the optional display 314, the optional I/O components 316, and/or the optional sensors may be coupled to each other via one or more local buses (not shown for simplicity).

The display 314 may be any suitable display or screen allowing for user interaction and/or to present items (such as captured images, video, or a preview image and an indication of the final orientation) for viewing by a user. In some aspects, the display 314 may be a touch-sensitive display. The I/O components 316 may be or include any suitable mechanism, interface, or device to receive input (such as commands) from the user and to provide output to the user. For example, the I/O components 316 may include (but are not limited to) a graphical user interface, keyboard, mouse, microphone and speakers, and so on. The display 314 and/or the I/O components 316 may provide a preview image or image being captured to a user and/or receive a user input for adjusting the displayed image's orientation or the orientation of an image to be captured.

The camera controller 310 may include an image signal processor 312, which may be one or more image signal processors to process captured image frames or video provided by the camera 302. In some example implementations, the camera controller 310 (such as the image signal processor 312) may also control operation of the camera 302. In some aspects, the image signal processor 312 may execute instructions from a memory (such as instructions 308 from the memory 306 or instructions stored in a separate memory coupled to the image signal processor 312) to process image frames or video captured by the camera 302 and/or control the camera 302. In other aspects, the image signal processor 312 may include specific hardware to process image frames or video captured by the camera 302. The image signal processor 312 may alternatively or additionally include a combination of specific hardware and the ability to execute software instructions.

The device 300 may indicate to a user a final orientation of the captured image or image to be captured. The following examples and description use the term "captured image" for illustrative purposes, but a "captured image" may include a preview image, video, or image stream that is being captured or to be captured for full processing by the image processing pipeline. Further, while the following examples and description use the device 300, the device 300 is an example device for illustrative purposes. Any suitable device may be used, and the present disclosure should not be limited to the device 300 or a specific device or configuration.

In some example implementations, the device 300 may provide an indication to the user as to the final orientation of an image before the image is fully processed. The final orientation of the image may be indicated on the display 314 of the device 300 so that a user may identify the final orientation of the image in relation to the device 300 and therefore in relation to the user. While the following examples describe a visual indication, the indication may be any suitable type of indication, such as audible, haptic, etc. Therefore, the present disclosure should not be limited to visual indications of the final orientation.

Figure 4:
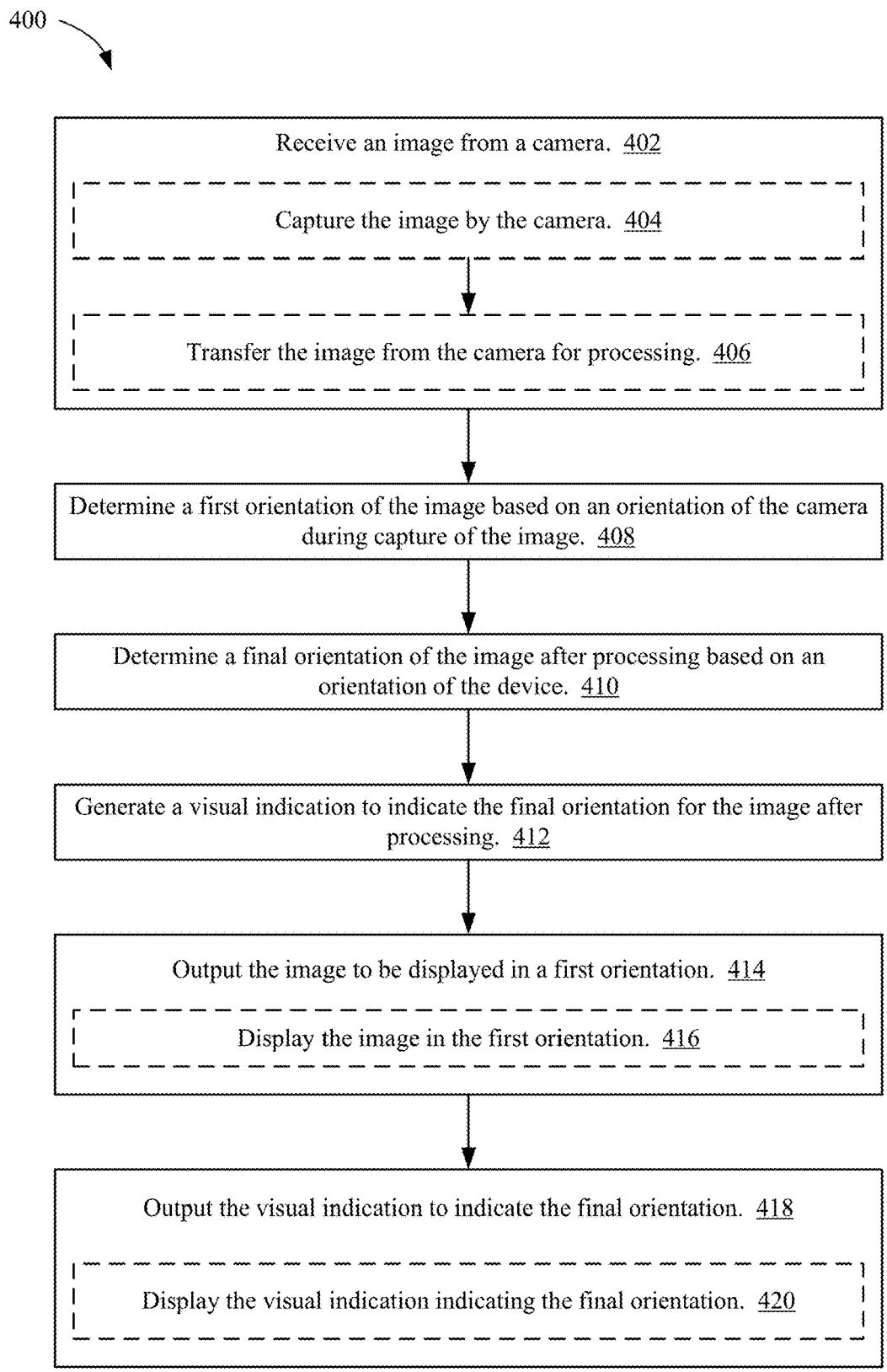
FIG. 4 is an illustrative flow chart depicting an example operation for indicating a final orientation of an image to be processed.

FIG. 4 is an illustrative flow chart depicting an example operation 400 for indicating a final orientation of an image to be processed. Beginning at 402, the device 300 (from FIG. 3) may receive an image from a camera (such as the camera 302). In some example implementations, the camera 302 may capture an image (404), and the captured image may be transferred from the camera 302 for processing (406). For example, the captured image may be transferred from the camera 302 to the camera controller 310 (such as the image signal processor 312) or to the processor 304 for processing by the image processing pipeline.

The image may be a preview image (which is not fully processed by the image processing pipeline) or another image to be, but not yet, fully processed by the image processing pipeline. For example, if a user input is received during a preview stream to capture an image, the last frame of the preview stream may be fully processed by the image processing pipeline to provide the final image. In another example, the preview stream may be a lower resolution or have other dissimilar characteristics from an image to be captured such that another image, other than the preview stream, is captured and fully processed.

Before fully processing the image, the device 300 may determine a first orientation of the image based on an orientation of the camera during capture of the image (408). In one example, the first orientation may be the same orientation as the camera sensor capturing the image (i.e., without any adjustments to the orientation of the image). The device may also determine a final orientation for the image after processing (410). In some example implementations, the device 300 may determine the final orientation for the image based on a previous device orientation. For example, if the device 300 is oriented directly up or directly down such that the roll does not affect the direction of the gravitational force relative to the device 300, the device 300 may use its preceding device orientation to determine the final orientation for the image. If the camera sensor is not fixed to the device 300 (such as the camera being movable from the device 300), the device 300 may determine the final orientation based on a previous camera orientation or the previous camera orientation in relation to the concurrent device orientation. A device orientation therefore includes the orientation of the device, the orientation of the camera, or the orientation of the camera relative to the device.

After determining the final orientation of the image after processing, the device 300 may generate a visual indication to indicate the final orientation for the image after processing (412). The visual indication may be any suitable visual cue for indicating the final orientation of the image. Some example visual indications include, but are not limited to, an arrow to indicating the top or the bottom of the image, a highlight or other indication placed at the intended top (or bottom) of the image, and a shading or other adjustment of the brightness of the intended top (or bottom) of the image. Some example visual indications are described below regarding FIG. 5A-FIG. 5D.

After determining the first orientation for the image, the device 300 may output the image to be displayed in the first orientation (414). In some example implementations, the display 314 may display the image in the first orientation (416).

The device 300 may also output the visual indication to indicate the final orientation (418). In some example implementations, the display 314 may display the visual indication indicating the final orientation of the image after processing (420). In one example, the display 314 may display concurrently the image in the first orientation and the visual indication. In another example, the display 314 may alternate between displaying the image in the first orientation and the visual indication (such as in a side-by-side view, the visual indication overlaid on the image in the first orientation, or any other suitable means for displaying).

Figure 5A:
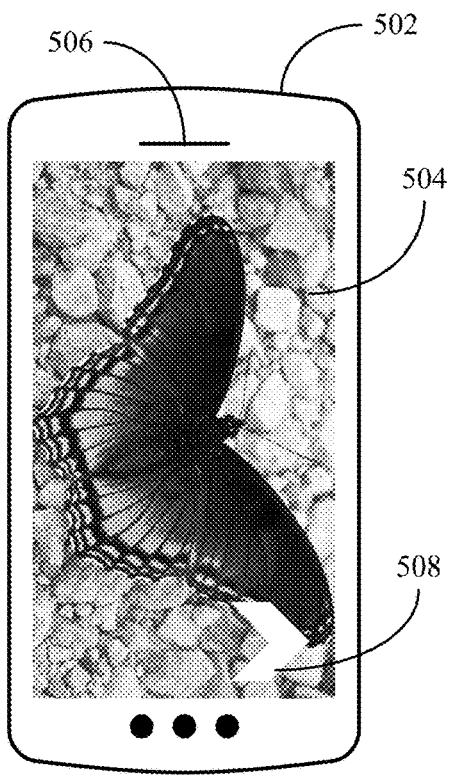
FIG. 5A is a depiction of an example visual indication concurrently displayed with the image.

FIG. 5A is a depiction of an example visual indication 508 concurrently displayed with the image 504. The device 502 displays the image 504 in a first orientation (e.g., as captured without adjusting the orientation). In the example, the first orientation may be that the top of the image 504 is toward the earpiece 506 of the device 502.

The example visual indication 508 is an arrow indicating the top of the image after processing. Instead of the final top of the image 504 being the edge toward the earpiece 506, the visual indication 508 indicates that the top of the image 504 is to be the right edge. As such, the image 504 is to be rotated 90 degrees counterclockwise during processing. While the arrow is shown to be in the bottom right of the display of the device 502, the arrow may be in any suitable location on the display or on a separate display.

Figure 5B:
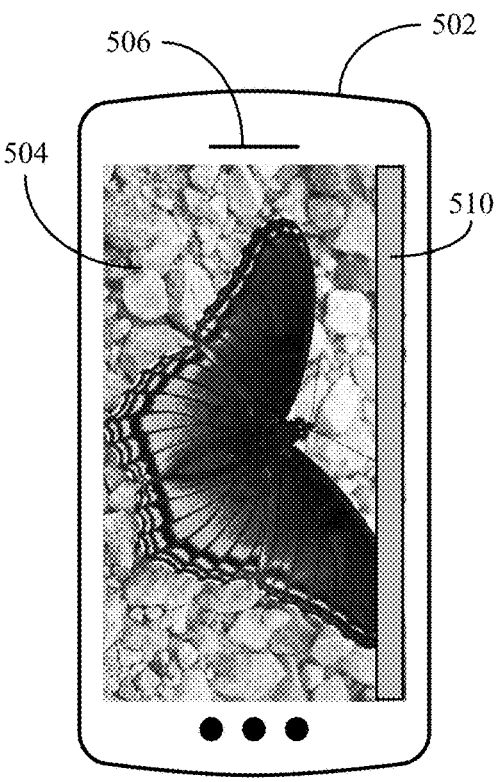
FIG. 5B is a depiction of another example visual indication concurrently displayed with the image.
Figure 5C:
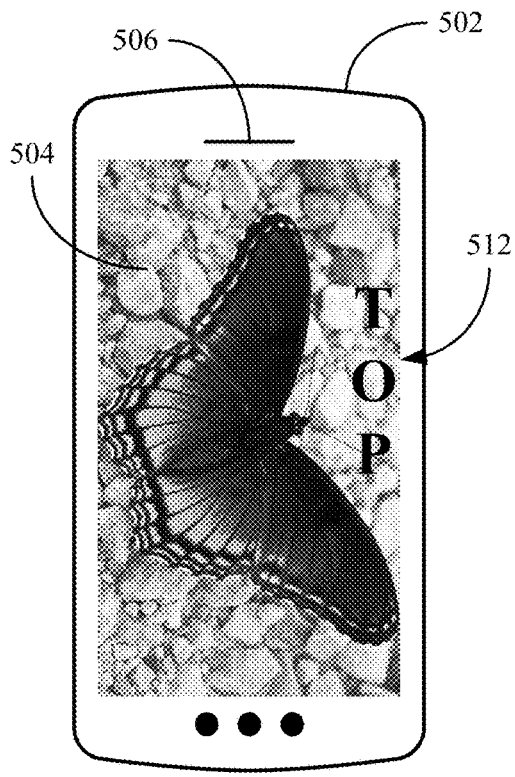
FIG. 5C is a depiction of a further example visual indication concurrently displayed with the image.

FIG. 5B is a depiction of another example visual indication 510 concurrently displayed with the image 504. Instead of an arrow, the visual indication 510 is a bar or banner placed at the edge of the image that is to be the top after processing. In some example implementations, the banner may include text to further indicate the top of the image 504 after processing. FIG. 5C is a depiction of a further example visual indication 512 concurrently displayed with the image 504. Instead of an arrow or a banner, the visual indication 512 is text to indicate the top of the image 504 after processing. While the examples illustrate the visual indication indicating the top of the image, any edge or portion of the image may be indicated, and the present disclosure should not be limited to the following examples.

Figure 5D:
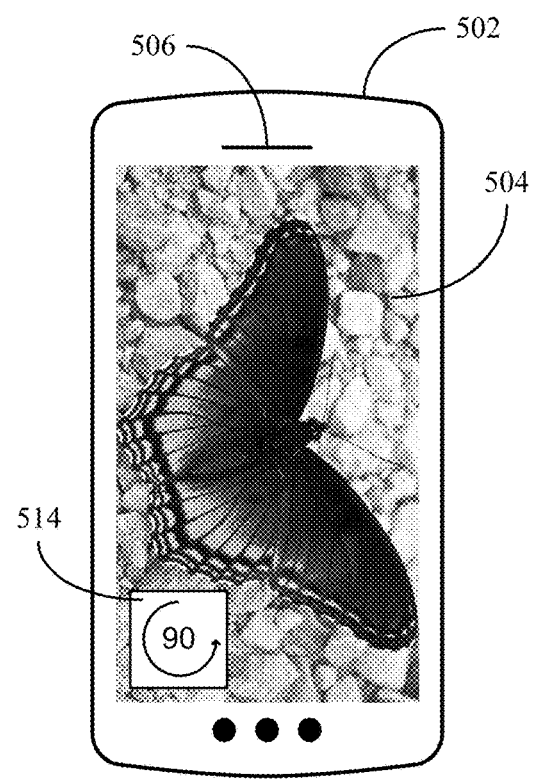
FIG. 5D is a depiction of another example visual indication concurrently displayed with the image.

Alternative to the visual indication indicating or highlighting an edge of the image, the visual indication may indicate the adjustment to the orientation to be performed in processing. FIG. 5D is a depiction of another example visual indication 514 concurrently displayed with the image 504. The visual indication 514 indicates that the image is to be rotated 90 degrees counterclockwise during processing. While the visual indication 514 is depicted as being in the bottom left of the display of the device 502, the visual indication 514 may be in any suitable location on the display or on a separate display.

The illustrated visual indications 508-514 are only examples, and the present disclosure should not be limited to the provided illustrations. For example, the visual indication may be a shading of the image, a pictorial representation of the rotation to be performed during processing, or any other suitable visual indication to indicate the final orientation of the image after being adjusted during processing.

The visual indication may allow a user to identify the final orientation of the image and determine if the final orientation is correct before processing. In some example implementations, a displayed preview stream may include the visual indication of the final orientation for an image to be processed. If the final orientation is incorrect and based on a previous device orientation (such as the orientation of the device before being oriented directly up or down), the user may adjust the orientation of the device (thus changing the previous orientation of the device). For example, if the device is oriented directly down, the user may lift the device (changing the pitch or yaw), rotate the device as intended (changing the roll), and again orienting the device directly down.

Referring back to FIG. 2A and FIG. 2B, if the visual indication indicates that the image will have a final orientation as image 202 (in FIG. 2A), but the user intends for the image to have a final orientation as image 204 (in FIG. 2B), the user may lift the device back into a portrait mode, flip the device upside down, and then orient the device directly down. In some example implementations, the device may receive a user input to capture an image for processing, and the device may capture the image, adjusting the orientation of the image to be the same as the image 204 in FIG. 2B.

Additionally or alternatively, the device may receive a user input to adjust the orientation of the image without the user adjusting the orientation of the device. FIG. 6 is an illustrative flow chart depicting an example operation 600 for adjusting an orientation of an image based on a user input. Beginning at 602, the device 300 may display an image with a first orientation and a visual indication of the final orientation of the image after processing. FIG. 5A-FIG. 5D depict examples of displaying the image and the visual indication. The device 300 may then receive a user input for adjusting the orientation of the image (604). In some example implementations, a touch from the user may be received on a touch-sensitive display 314 (606). The touch may then be used to adjust the final orientation and the visual indication (608).

Figure 7:
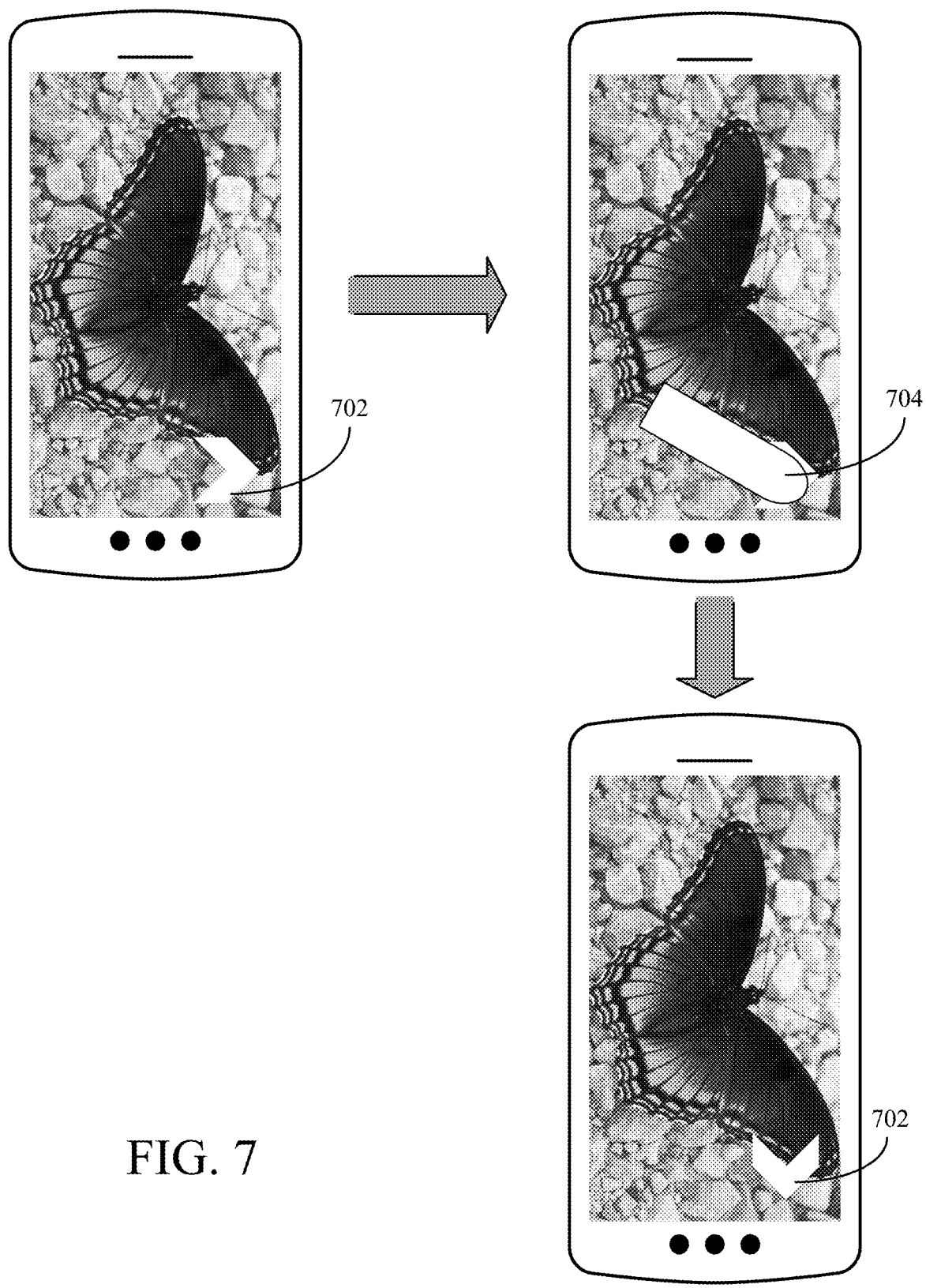
FIG. 7 is a depiction of an example user tap on a visual indication to adjust the final orientation of the image.

In one example, the user may tap the visual indication to rotate the final orientation a preset amount (such as 90 degrees). In an alternative example, the user may tap anywhere on the image to rotate the final orientation a preset amount. FIG. 7 is a depiction of an example user tap 704 on the visual indication 702 to adjust the final orientation of the image. The example image and the visual indication 702 is the same as in FIG. 5A. A user tap 704 causes the final orientation to be rotated 90 degrees clockwise. As a result, the visual indication 702 is rotated 90 degrees clockwise to indicate the update final orientation.

Figure 8A:
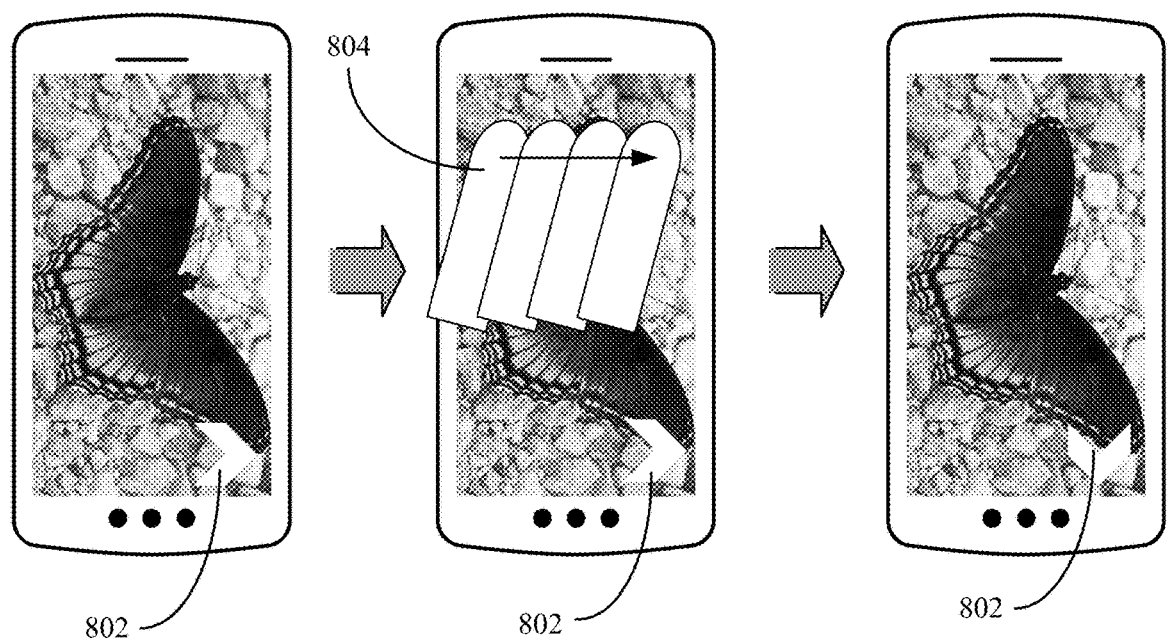
FIG. 8A is a depiction of an example user swipe to rotate clockwise the final orientation of the image.

Additionally or alternatively, the user may swipe the image to rotate the final orientation. FIG. 8A is a depiction of an example user swipe 804 to rotate clockwise the final orientation (and the visual indication 802). In some example implementations, the user may swipe right on the top half of the device display. The device may then rotate clockwise the final orientation by 90 degrees, and the visual indication 802 may be rotated clockwise 90 degrees. Similarly, the user may swipe left on the bottom half of the display to rotate clockwise the final orientation.

Figure 8B:
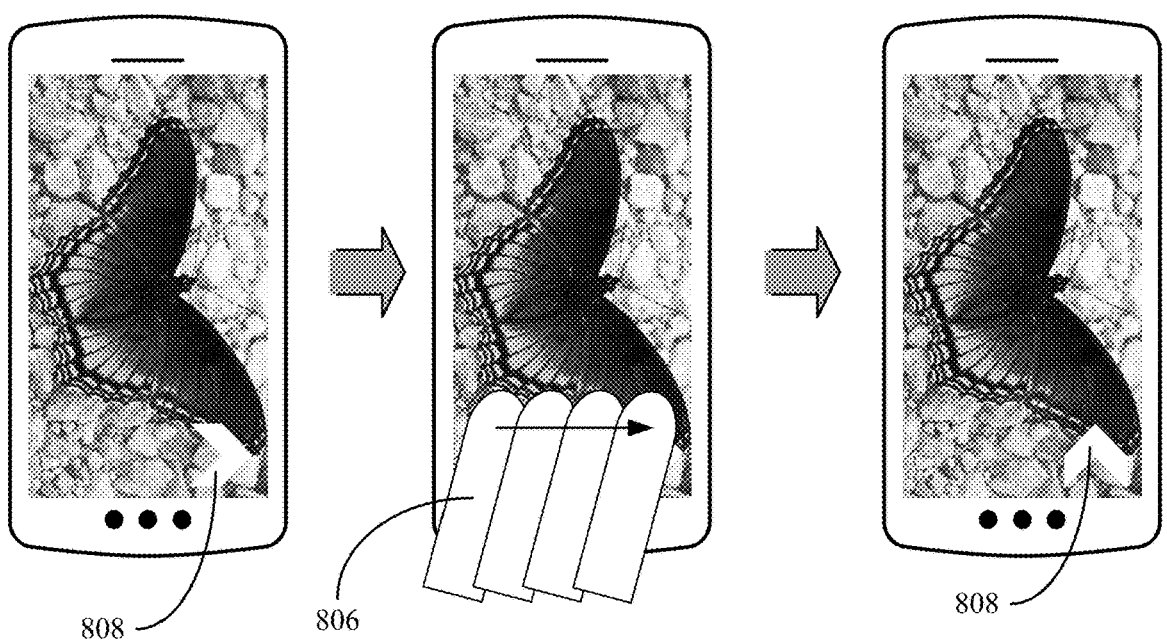
FIG. 8B is a depiction of an example user swipe to rotate counterclockwise the final orientation of the image.

FIG. 8B is a depiction of an example user swipe 806 to rotate counterclockwise the final orientation (and the visual indication 808). In some example implementations, the user may swipe right on the bottom half of the device display. The device may then rotate counterclockwise the final orientation by 90 degrees, and the visual indication 808 may be rotated counterclockwise 90 degrees. Similarly, the user may swipe left on the top half of the display to rotate counterclockwise the final orientation.

While some examples of a user tapping or swiping a display have been provided as a user input, any suitable user input may be used in adjusting the orientation of the image (such as adjusting the final orientation of the image to be processed). Therefore, the present disclosure should not be limited to the provided illustrations. For example, a user input may include squeezing the bezel of the device, moving the device (such as flicking or twisting the device), providing an audible command (such as "rotate clockwise X degrees"), using eye movements and tracking, etc. Further, while the visual indication is depicted as being adjusted, the orientation of the displayed image may additionally or alternatively be adjusted. For example, the image may be rotated based on a user tap or swipe on the display.

Referring back to 610 in FIG. 6, after receiving the user input to adjust the final orientation, the device 300 may display the image with the first orientation and the adjusted visual indication (corresponding to the adjusted final orientation for the image). In some example implementations, the image may be a preview image or a preview stream of an image to be captured and processed. The user may therefore provide a second user input (such as pressing a camera shutter button, squeezing the bezel, provide a confirmation that the adjusted final orientation is correct, etc.) for capturing the image to be fully processed. In some other example implementations, the image may be a captured image to be but not yet fully processed. The user may indicate that the adjusted final orientation is correct before the image is fully processed.

In some example implementations, the adjusted final orientation may be used for subsequent captures as long as the device 300 remains in the same orientation. If the device 300 senses a roll (either through image analysis or sensing rotational forces), the device 300 may further adjust the final orientation based on the sensed roll. In some other example implementations, the final orientation may remain fixed for further image captures unless further adjusted by a user input.

In some further example implementations, the device 300 may lock the final orientation even if the device orientation changes. For example, a user input may indicate that the current final orientation for an image to be processed is to be locked and used irrespective of device movements. As a result, the user may adjust the device 300 without concern that the final orientation may change based on the device movements. For example, if a user is capturing an image of a paper on the table, and the visual indication indicates a preferred final orientation, a user input (such as touching a lock button, holding the visual indication, or any other suitable user input) may lock the final orientation as indicated by the visual indication. Afterwards, if the user needs to move the device 300 to capture all of the paper in an image (such as rotate or shifting the device 300 to place the paper in the field of view of the camera 302), the user may not need to be concerned that moving the device 300 causes the previous orientation to change and therefore change the final orientation for the image to be captured.

After a final orientation is determined (such as after being adjusted), the device 300 may fully process a captured image to include the final orientation. In some example implementations, the device 300 may store the processed image. For example, the processed image may be stored in the memory 306. Also, while image orientation is described regarding the roll of the device, the image orientation may be based on other components of the device orientation, and the present disclosure should not be limited to determining an image orientation based on a roll component of the device.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 306 in the example device 300 of FIG. 3) comprising instructions 308 that, when executed by the processor 304 (or the camera controller 310 or the image signal processor 312), cause the device 300 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 304 or the image signal processor 312 in the example device 300 of FIG. 3. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. For example, the steps of the described example operations, if performed by the device 300, the camera controller 310, the processor 304, and/or the image signal processor 312, may be performed in any order and at any frequency. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A device, comprising:
a memory;
a processor coupled to the memory, the processor configured to:
receive an image from a camera;
determine a first orientation of the image based on an orientation of the camera during preview of the image for capture;
determine, prior to capture of the image and based on an orientation of the device, a final orientation associated with the image after capture of the image;
generate, prior to capture of the image, a visual indication that indicates the final orientation for the image;
output the image to a display to preview the image in the first orientation;
output the visual indication to the display to indicate the final orientation;
receive a first user input to adjust the final orientation of the image;
adjust the final orientation based on the user input;
adjust the visual indication based on the adjusted final orientation; and
output the adjusted visual indication to the display.

2. The device of claim 1, wherein the processor is further configured to determine the final orientation based on a previous orientation of the device.

3. The device of claim 2, wherein the processor is further configured to, in response to the first user input, adjust the device orientation from the previous orientation.

4. The device of claim 1, further comprising the display configured to concurrently preview the image in the first orientation and the visual indication.

5. The device of claim 1, wherein the image is a preview image and the processor is further configured to:
receive a second user input for capturing a second image corresponding to the preview image;
instruct the camera to capture the second image in response to the second user input;
receive the second image from the camera; and
process the second image to have the adjusted final orientation.

6. The device of claim 1, wherein processor is further configured to, in response to the first user input, adjust the final orientation without adjustment to the device orientation.

7. The device of claim 1, wherein the processor is further configured to:
process the image to include the adjusted final orientation after processing; and
store in the memory the image with the adjusted final orientation.

8. A method, comprising:
receiving an image from a camera;
determining a first orientation of the image based on an orientation of the camera during preview of the image for capture;
determining, prior to capture of the image and based on an orientation of the device, a final orientation associated with the image after capture of the image;
generating, prior to capture of the image, a visual indication that indicates the final orientation for the image;

outputting the image to a display to preview the image in the first orientation;
outputting the visual indication to the display to indicate the final orientation;
receiving a first user input to adjust the final orientation of the image;
adjusting the final orientation based on the user input;
adjusting the visual indication based on the adjusted final orientation; and
outputting the adjusted visual indication to the display.

9. The method of claim 8, further comprising determining the final orientation based on a previous orientation of the device.

10. The method of claim 8, further comprising concurrently previewing the image in the first orientation and the visual indication.

11. The method of claim 8, wherein the image is a preview image and the method further comprises:
receiving a second user input for capturing a second image corresponding to the preview image;
instructing the camera to capture the second image in response to the second user input;
receiving the second image from the camera; and
processing the second image to have the adjusted final orientation.

12. The method of claim 8, further comprising, in response to the first user input, adjusting the device orientation from the previous orientation.

13. The method of claim 8, further comprising, in response to the first user input, adjusting the final orientation without adjusting the device orientation.

14. The method of claim 8, further comprising:
processing the image to include the adjusted final orientation after processing; and
storing, in memory, the image with the adjusted final orientation.

15. A non-transitory computer-readable medium storing one or more programs containing instructions that, when executed by one or more processors of a device, cause the device to:
receive an image from a camera;
determine a first orientation of the image based on an orientation of the camera during preview of the image for capture;
determine, prior to capture of the image and based on an orientation of the device, a final orientation associated with the image after capture of the image;
generate, prior to capture of the image, a visual indication that indicates the final orientation for the image;
output the image to a display to preview the image in the first orientation;
output the visual indication to the display to indicate the final orientation;
receive a first user input to adjust the final orientation of the image;
adjust the final orientation based on the user input;
adjust the visual indication based on the adjusted final orientation; and
output the adjusted visual indication to the display.

16. The computer-readable medium of claim 15, further storing instructions that, when executed by the one or more processors, cause the device to:
determine the final orientation based on a previous orientation of the device.

17. The computer-readable medium of claim 16, further storing instructions that, when executed by the one or more processors, cause the device to, in response to the first user input, adjust the device orientation from the previous orientation or adjust the final orientation without adjustment to the device orientation.

18. The computer-readable medium of claim 15, further storing instructions that, when executed by the one or more processors, cause the device to:
concurrently preview the image in the first orientation and the visual indication.

19. The computer-readable medium of claim 15, wherein the image is a preview image and the computer-readable medium further stores instructions that, when executed by the one or more processors, cause the device to:
receive a second user input for capturing a second image corresponding to the preview image;
instruct the camera to capture the second image in response to the second user input;
receive the second image from the camera; and
process the second image to have the adjusted final orientation.

20. The computer-readable medium of claim 15, further storing instructions that, when executed by the one or more processors, cause the device to:
process the image to include the adjusted final orientation after processing; and
store, in memory, the image with the adjusted final orientation.

21. A device, comprising:
means for obtaining an image for capture;
means for determining a first orientation of the image for capture based on an orientation of the means for obtaining the image for capture;
means for determining, prior to capture of the image and based on an orientation of the device, a final orientation associated with the image after capture;
means for generating, prior to capture of the image, a visual indication that indicates the final orientation for the image;
means for previewing the image in the first orientation;
means for previewing the visual indication to indicate the final orientation;
means for receiving a first user input to adjust the final orientation of the image;
means for adjusting the final orientation based on the user input;
means for adjusting the visual indication based on the adjusted final orientation; and
means for previewing the adjusted visual indication.

22. The device of claim 21, wherein the means for determining the final orientation comprises means for determining the final orientation based on a previous orientation of the device.

23. The device of claim 21, wherein the means for previewing the visual indication comprises means for previewing the visual indication concurrently with the image in the first orientation.

24. The device of claim 21, wherein the image is a preview image and the device further comprising:
means for receiving a second user input for capturing a second image corresponding to the preview image;
means for capturing the second image in response to the second user input; and
means for processing the second image to have the adjusted final orientation.

25. The device of claim 21, further comprising:
means for processing the image to include the adjusted final orientation after processing; and means for storing the image with the final adjusted orientation.

\* \* \* \* \*